United States Patent
Pinjala et al.

(10) Patent No.: US 11,930,299 B2
(45) Date of Patent: Mar. 12, 2024

(54) MEASURING AUDIO AND VIDEO LATENCIES IN VIRTUAL DESKTOP ENVIRONMENTS

(71) Applicant: VMware LLC, Palo Alto, CA (US)

(72) Inventors: Srinivas Shyam Pinjala, Bangalore (IN); Lakshmi Gayatri Kundem, Bangalore (IN); Duraipandian Kuppuraman, Bangalore (IN); Janani Karthikeyan, Tiruppur (IN)

(73) Assignee: VMware LLC, Palo Alto, CA (US)

( * ) Notice: Subject to any disclaimer, the term of this patent is extended or adjusted under 35 U.S.C. 154(b) by 136 days.

(21) Appl. No.: 17/216,829

(22) Filed: Mar. 30, 2021

(65) Prior Publication Data

US 2022/0239865 A1    Jul. 28, 2022

(30) Foreign Application Priority Data

Jan. 22, 2021    (IN) .............................. 202141003129

(51) Int. Cl.
*H04N 7/15*    (2006.01)
*G06F 9/455*    (2018.01)
*H04N 7/14*    (2006.01)

(52) U.S. Cl.
CPC ......... *H04N 7/157* (2013.01); *G06F 9/45558* (2013.01); *H04N 7/147* (2013.01); *G06F 2009/4557* (2013.01); *G06F 2009/45579* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 7,831,661 B2 | 11/2010 | Makhija et al. |
| 8,166,107 B2 | 4/2012 | Makhija et al. |
| 8,788,079 B2 | 7/2014 | Spracklen |
| 8,902,248 B1 | 12/2014 | Bidarkar et al. |
| 8,910,228 B2 | 12/2014 | Agrawal et al. |
| 9,201,755 B2 | 12/2015 | Bidarkar et al. |
| 9,214,004 B2 | 12/2015 | Agrawal et al. |
| 9,264,704 B2 | 2/2016 | Gong et al. |
| 9,292,401 B2 | 3/2016 | Agrawal et al. |
| 9,336,117 B2 | 5/2016 | Agrawal et al. |
| 9,471,951 B2 | 10/2016 | Agrawal et al. |
| 9,614,892 B2 | 4/2017 | Bidarkar et al. |
| 9,674,263 B2 | 6/2017 | Spracklen et al. |
| 9,674,518 B2 | 6/2017 | Agrawal et al. |
| 9,699,247 B2 | 7/2017 | Agrawal et al. |

(Continued)

*Primary Examiner* — Quoc D Tran
(74) *Attorney, Agent, or Firm* — Quarles & Brady LLP

(57) ABSTRACT

Described herein are systems, methods, and software to monitor latency information in virtual desktop environments. In one example, a user computing system may obtain a first frame of video data from a second computing system, wherein the video data is streamed from the user computing system to the second computing system. The user computing system further identifies a first frame number for the first frame based on a code in the first frame, identifies a frame number for second frame of the video data to be streamed to the second computing system when first frame was received, and determines frame latency based on a difference between the first frame number and the second frame number.

20 Claims, 7 Drawing Sheets

(56) References Cited

U.S. PATENT DOCUMENTS

| | | | |
|---|---|---|---|
| 2011/0263243 A1* | 10/2011 | Topaltzas | H04W 24/06 |
| | | | 455/423 |
| 2012/0069137 A1* | 3/2012 | Thapa | H04N 7/15 |
| | | | 348/E7.083 |
| 2015/0030084 A1* | 1/2015 | Marchya | H04N 17/004 |
| | | | 375/240.26 |
| 2019/0074036 A1* | 3/2019 | Cohen | G11B 27/36 |
| 2019/0342594 A1* | 11/2019 | Korte | H04N 21/4394 |
| 2020/0280761 A1* | 9/2020 | Staples | G06T 7/246 |
| 2021/0203519 A1* | 7/2021 | Sharma | H04N 21/2665 |

* cited by examiner ular Application Serial No. 202141003129 filed in India entitled
MEASURING AUDIO AND VIDEO LATENCIES IN VIRTUAL DESKTOP ENVIRONMENTS

RELATED APPLICATIONS

Benefit is claimed under 35 U.S.C. 119(a)-(d) to Foreign Application Serial No. 202141003129 filed in India entitled "MEASURING AUDIO AND VIDEO LATENCIES IN VIRTUAL DESKTOP ENVIRONMENTS", on Jan. 22, 2021, by VMware, Inc., which is herein incorporated in its entirety by reference for all purposes.

TECHNICAL BACKGROUND

Virtual desktop environments use remote host computing systems to provide a virtual machine to requesting end users at client systems. The client systems may comprise desktop computers, laptop computers, tablets, or some other end user device. When a user initiates a login to a virtual desktop service, the user may be allocated a virtual machine and the desktop of the virtual machine may be provided for display on the end user device. The user may use local hardware, such as a mouse, touchpad, keyboard, and the like to interact with the provided desktop.

In some implementations, additional hardware may be passed through from the client device to the allocated virtual machine. For example, a webcam or microphone may be passed through to a video conferencing application executing on the virtual machine. However, while the virtual machine can execute the conferencing application for the user, problems can arise associated with the latency of providing the audio and video data to the remote host computing system and returning the audio video data to the client system.

SUMMARY

The technology described herein monitors audio and video latencies in virtual desktop environments. In one implementation, a first computing system receives a first frame of video data from a second computing system, wherein the video data originates from the first computing system and is streamed to the second computing system by the first computing system. In some implementations, the video data may be generated as part of a virtual camera at the first computing system and, when received from the second computing system, the video data may be part of a virtual desktop provided by the second computing system. Once received, the first computing system identifies a first frame number for the first frame based on code embedded in the first frame. The first computing system further identifies a second frame of the video data to be streamed by the first computing system to the second computing system when the first frame was received and identifies a second frame number associated with the second frame. The first computing system then determines frame latency based on a difference between the first frame number and the second frame number.

DETAILED DESCRIPTION

Figure 1:
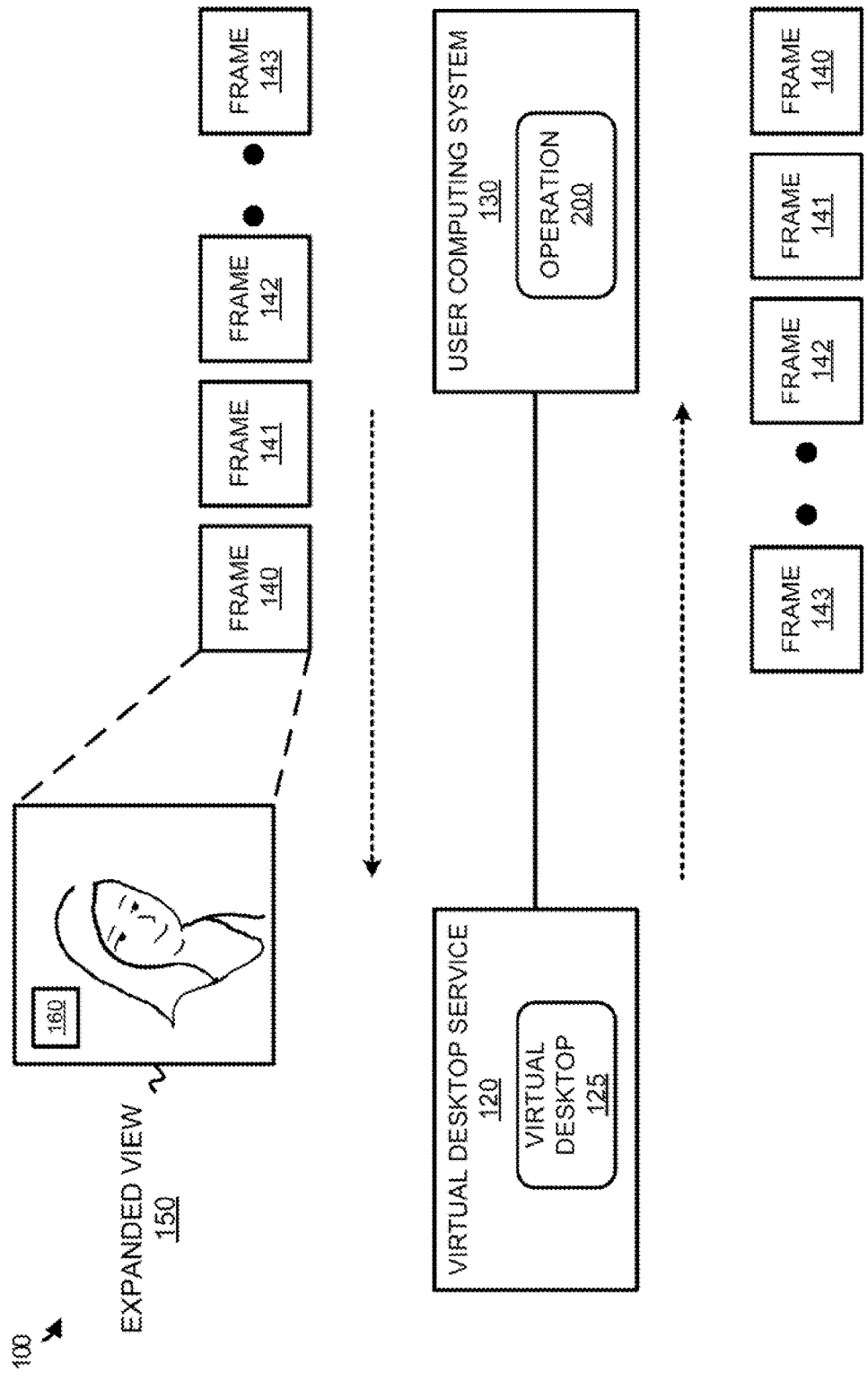
FIG. 1 illustrates a computing environment to monitor audio and video latencies for a virtual desktop according to an implementation.

FIG. 1 illustrates a computing environment 100 to monitor audio and video latencies for a virtual desktop according to an implementation. Computing environment 100 includes virtual desktop service 120, user computing system 130, and frames 140-143. Frame 140 is expanded as part of expanded view 150, wherein frame 140 includes an embedded code 160. Virtual desktop service 120 provides virtual desktop 125 for use by user computing system 130. User computing system 130 provides operation 200, which is further described in FIG. 2.

In operation, user computing system 130 may generate a request for a virtual desktop provided by virtual desktop service 120. Virtual desktop service 120 may include one or more server computing systems capable of executing virtual desktops (virtual machines) that include applications, files, and other software elements for users of the virtual desktops. In at least one example, a user at user computing system 130 may provide login credentials to virtual desktop service 120. Once the credentials are verified, virtual desktop service 120 may identify a virtual machine to support the request and provide a connection for the user at user computing system 130 to interact with virtual desktop 125. In some instances, the connection may permit virtual desktop 125 to be displayed on user computing system 130, while peripherals, such as keyboard, mouse, microphone, camera, or other physical peripherals at user computing system 130 interact with the virtual desktop.

In some implementations, as a result of the physical peripherals being remote from virtual desktop 125, latency may be introduced in the way that objects are visualized or made audible by virtual desktop 125 when delivered to user computing system 130. For example, a camera may have latency introduced by communicating the video data to virtual desktop 125, latency introduced by processing the video data at the remote virtual desktop or the server supporting the remote virtual desktop, and latency introduced by communicating the video data back as part of virtual desktop 125 to user computing system 130, wherein the video data may be displayed as part of a video conferencing application, live video application, or some other application executing on the virtual desktop.

Here, to monitor the latency introduced in video data, user computing system 130 may stream frames of generated or stored video data to virtual desktop 120, wherein each of the frames contains a code, represented in frame 140 as code 160. Code 160 may comprise Quick Response (QR) code, information encoded as one or more pixels, or some other code in the frame. The code may include a frame number to identify the frame in a sequence of frames, audio information, such as audio samples associated with the frame, or some other information associated with latency of the video or audio data. In some implementations, the video data may be generated as a virtual camera located on user computing system 130. For example, to determine latency information associated with a video conferencing application, user computing system 130 may stream frames 140-143 to virtual desktop service 120 as if frames 140-143 were generated by camera on user computing system 130. Once communicated to the virtual desktop service and provided to the virtual desktop, the frame may be displayed as part of the virtual desktop at user computing system 130. To identify the latency associated with the communicating a frame, such as frame 140, to the virtual desktop service and displaying the frame as part of virtual desktop 125 at user computing system 130, user computing system 130 may compare the frame number identified from code 160 to a frame number associated with a current frame to be streamed by user computing system 130. The difference between the frame numbers may be used to calculate the latency associated with generating the video data and displaying the video data on user computing system 130 as part of virtual desktop 125.

In some implementations, in addition to or in place of determining the latency associated with the frames, user computing system 130 may determine latency associated with audio for frames 140-143. In calculating the latency, or the difference between the actual audio data and the expected audio data, user computing system 130 may receive video frames and identify expected audio for the video frames based on the codes embedded in the frames. For example, if the video were streamed at thirty frames per second and the sample rate for the audio were 44,000 samples per second for the video data, the expected audio data in the code for a frame may represent 1466 samples or the audio data expected for the duration of the frame ($\frac{1}{30}^{th}$ of a second). User computing system 130 may further monitor output audio data for the first computing system when the frame is returned and displayed at user computing system 130 and compare the output audio data with the expected audio for the frames. This output audio data may comprise audio data that was communicated as part of a stream to the virtual desktop service with the video data and communicated back with the display of virtual desktop 125. Based on the time difference between the expected audio data and the output audio data, user computing system 130 may determine the synchronization state for the audio relative to the video data, wherein the synchronization state may indicate that the audio data is late in relation to the video data, the audio data is early in relation to the video data, or the audio data is in sync with the video data.

For example, when frame 140 is received by user computing system 130 as part of virtual desktop 125 (e.g., in a video chat application executing on virtual desktop 125), user computing system 130 may extract the samples from embedded code 160. Additionally, user computing system 130 may monitor the output audio data at user computing system 130 to determine if the output audio data matches the displayed frame. This output audio data may include audio data that was communicated with the frame to virtual desktop 125 and returned to user computing system 130 to be output at user computing system 130. Accordingly, if the output audio data precedes the frame in the visualization of virtual desktop 125 at user computing system 130, a display may be generated to demonstrate the differences between the actual audio data and the expected audio data for the frame. The display may include a graph, a time difference between actual samples and expected samples, or some other display.

In some implementations, similar operations may be performed at virtual desktop service 120, wherein audio data with the audio stream for the video from user computing system 130 may be compared to expected audio data identified in embedded in the code of the frame.

Figure 2:
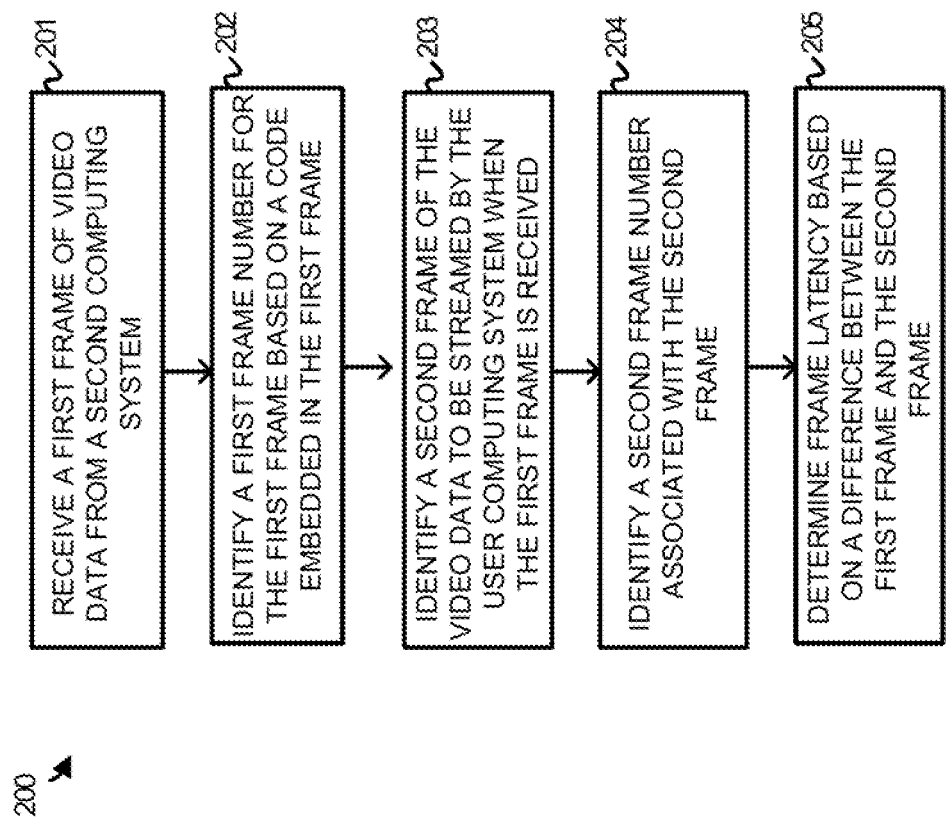
FIG. 2 illustrates an operation of a user computing system to monitor video latency according to an implementation.

FIG. 2 illustrates an operation 200 of a user computing system to monitor video latency according to an implementation. The steps of operation 200 are referenced parenthetically in the paragraphs that follow with reference to systems and elements of computing environment 100 of FIG. 1.

As described herein, user computing system 130 may request a virtual desktop session from virtual desktop service 120 and be allocated a virtual desktop 125 on a host computing system of virtual desktop service 120. Once virtual desktop 125 is allocated for the session, user computing system 130 may perform operation 200 that includes receiving (201) a first frame of video data from a second computing system (virtual desktop), wherein the video data is streamed or communicated from the user computing system to the virtual desktop executing on the host as though the video data was captured using a device at the user computing system. In some implementations, the streaming of the video data may include communicating the video data to the virtual desktop as though the video data was captured using a camera at the user computing system, captured using a video capture card, or captured using some other device. For example, user computing system 130 may stream video data to virtual desktop 125 as though the video data was captured by a web camera that is being passed through to virtual desktop 125 by virtual desktop service 120. Once received by virtual desktop 125, virtual desktop 125 may display the video data as part of the desktop and communicate a visual display of the desktop, which includes at least the video data, to user computing system 130.

Once the first frame is received by user computing system 130, operation 200 further identifies (202) a first frame number for the first frame based on a code embedded in the first frame. In some implementations, the video data that is streamed from user computing system 130 to virtual desktop 125 may include an embedded code that can be used to identify the frame number, audio data associated with the frame, or some other information associated with the frame. The embedded code may comprise a QR code, information embedded as pixels in the image (e.g., replacing pixel values in the image with the frame number information), or embedded in some other manner.

Once the first frame is received, user computing system 130 further identifies (203) a second frame of the video data to be streamed to virtual desktop 125 when the first frame was received. As described previously, user computing system 130 may stream the video data as though it was captured by a device at user computing system 130. As a result, new frames of video data may be communicated to virtual desktop 125, while earlier frames are received as part of the visual display of virtual desktop 125 at user computing system 130. For example, frame 140 may be received from virtual desktop service 120 while frame 143 is being prepared to be streamed to virtual desktop 125. After the second frame is identified, operation 200 identifies (204) a second frame number associated with the second frame and determines (205) frame latency based on a difference between the first frame number and the second frame number.

As an example, frames 140-143 may represent video data associated with a virtual capture device that captures video at sixty hertz. As a result, if frame 140 were received when frame 142 is to be communicated to virtual desktop 125, the latency would be two frames or 0.033 seconds. Once the latency information is identified, the latency information may be provided as a summary to the user at user computing system 130. The summary may indicate the latency associated with the frames, a rating of the latency in relation to other users or an expected latency, suggestions to improve the latency, or some other information as part of the summary.

In some implementations, in addition to identifying the latency associated with the frames, user computing system 130 may identify other timing issues associated with communicating the video data to a remote computing system. In one example, the embedded code for frames 140-143 may include sampling information for audio associated with each of the frames. Using this information, user computing system 130 may determine whether the audio stream associated with the video data is synced with the frames or images of the video data. For example, when frames are received, the expected audio data may be extracted from the embedded code and compared to the actual audio data output for user computing system 130, wherein the output audio data may be provided as a separate stream from virtual desktop 125. Based on the comparison, user computing system 130 may determine whether the audio is delayed, early, or synced. User computing system 130 may further generate a user interface summary for the user of user computing system 130, wherein the summary may indicate graphically the difference between the actual audio data and the expected audio data, numerical values associated with the difference between the actual audio data and the expected audio data, possible causes of the differences, or some other information. In some implementations, user computing system 130 may further take action to synchronize the audio and video data by delaying the audio, communicating a notification to virtual desktop 125 to delay the frames of video, or implementing some other action to synchronize the audio and video data.

Although demonstrated as using a virtual desktop or virtual machine as the remote second computing system, it should be understood that similar operations may be used with remote desktops or terminal servers. In particular, rather than a virtual machine as the remote computing system, the remote second computing system may comprise a physical computing system and may be accessible to one or more different users. For example, in a terminal server environment, multiple users may access the same server computing system at the same time to provide their desired operations. These physical computing systems may introduce the same latency as the virtual computing systems (virtual desktops).

Figure 3:
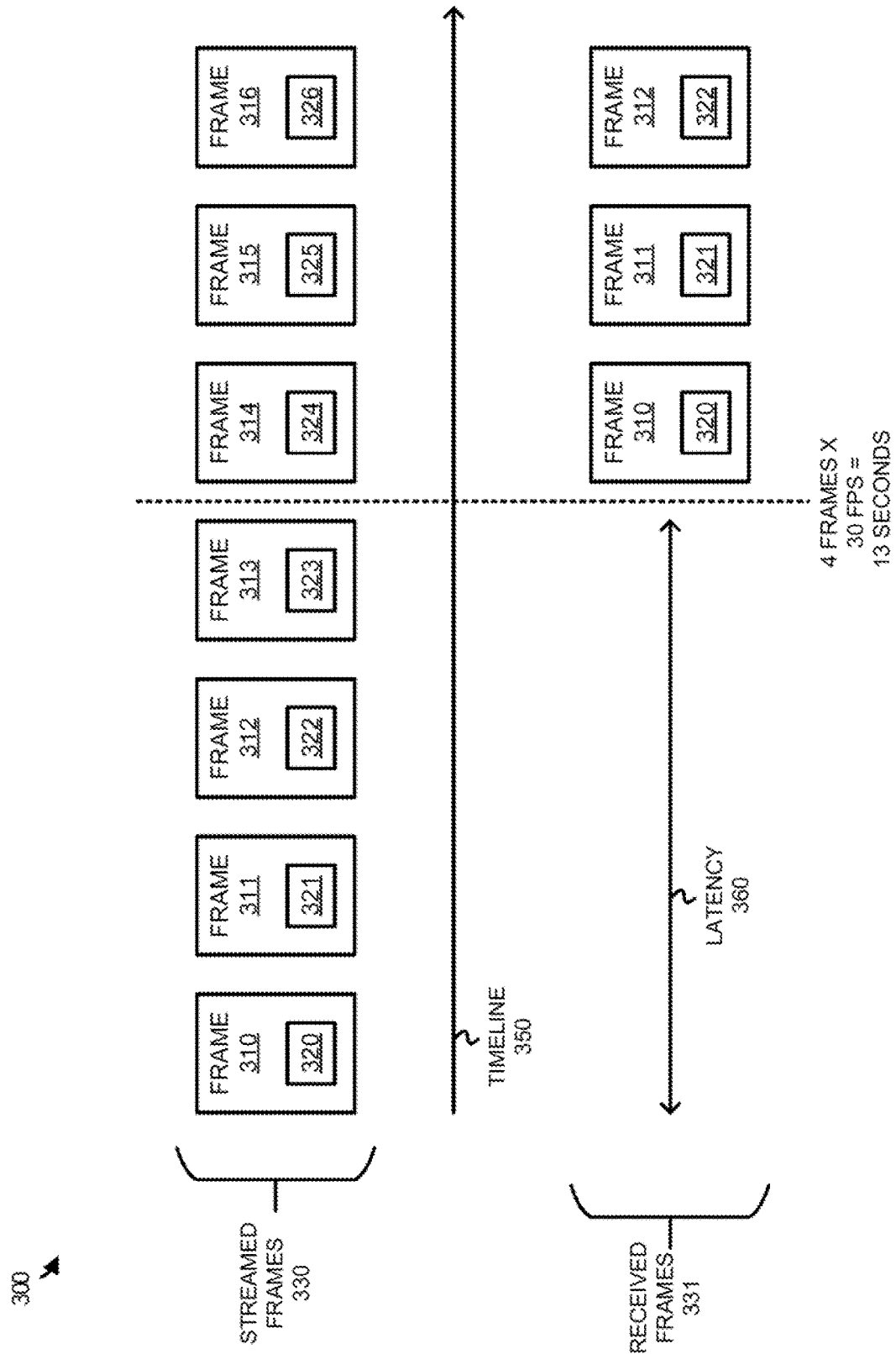
FIG. 3 illustrates an operational scenario of identifying video latency at a user computing system according to an implementation.

FIG. 3 illustrates an operational scenario 300 of identifying video latency at a user computing system according to an implementation. Operational scenario 300 includes streamed frames 330 and received frames 331. Operational scenario 300 further includes frames 310-316 with codes 320-326, timeline 350, and latency 360.

In operation, a first user computing system identifies and streams frames 310-316 to a second destination computing system. The destination computing system may comprise a virtual desktop or virtual machine, a remote physical computing system, or some other destination computing system for providing remote computing for the first computing system. In some implementations, the first user computing system may store video data that is streamed to the second computing system as though the video data were captured by a local capture device to the first computing system. Consequently, the first computing system may communicate the video data in real-time as though the video data were being captured.

As the video data is streamed to the second computing system, an application executing on the remote computing system, such as a video conferencing application executing in a virtual desktop, may display the video data as part of the desktop and provide the desktop for display at the end user computing system. Here, the user computing system receives frames 310-312 from the remote second computing system, wherein the frames 310-312 may be located in at least a portion of the virtual desktop view. When a frame is received, such as frame 310, the user computing system may identify a frame number based on code 320 embedded in frame 310. Additionally, the user computing system may identify another frame 314 that is prepared to be streamed to the second computing system when frame 310 was received. The user computing system then identifies a frame number associated with frame 314, in some examples using the code embedded for frame 314 and calculates latency 360 based on the difference between the frame numbers.

In some implementations, to calculate latency the user computing system may calculate the difference between the number of frames and multiply the frames by a framerate to determine the latency associated with communicating the video data to the remote computing system and receiving the visual representation of the desktop of the remote computing system. For example, the four frame difference between frame 314 and frame 310 may be multiplied by the frequency of the frames (e.g., $\frac{1}{30}$ for a 30 hertz framerate) to determine the latency introduced by using the remote computing system for the application.

In some examples, the user computing system may generate a summary that can be displayed to the user of the user computing system to indicate the latency information. The summary may indicate the latency, in seconds, frames, or some other unit, may monitor the latency as a function of time, or may provide some other information about the latency. In some implementations, the summary may further provide information about the latency in relation to other users of the virtual desktop service, in relation to previous sessions, or some other quality of service information based on the latency of the frames. Additionally, the summary may indicate suggestions to improve the quality of service or latency, including changing from a wireless to a wired communication, changing the quality of the video data provided to the virtual desktop, or changing some other configuration associated with the connection and/or hardware passed through to the remote computing system.

Figure 4:
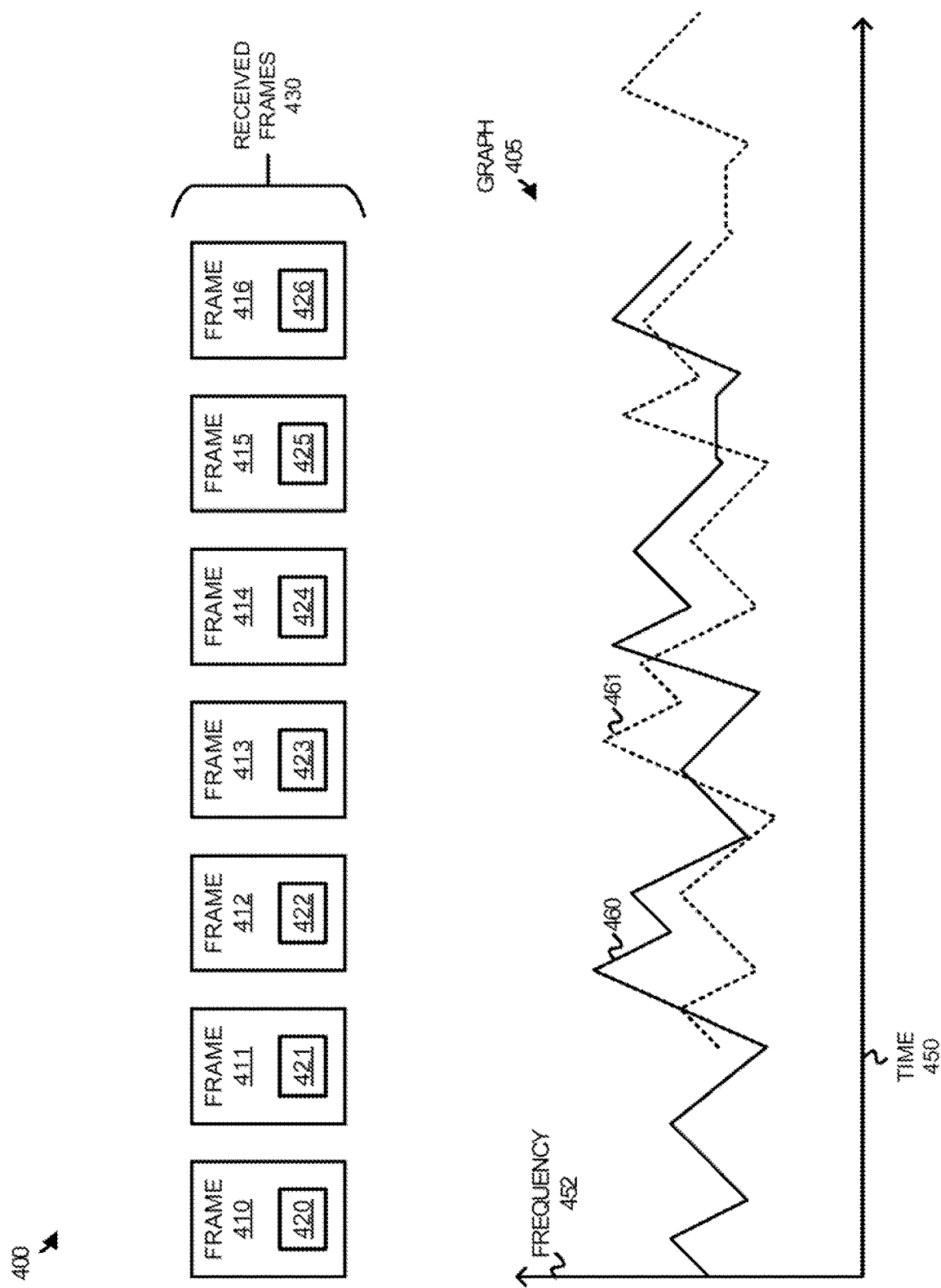
FIG. 4 illustrates an operational scenario of identifying audio synchronization issues according to an implementation.

FIG. 4 illustrates an operational scenario 400 of identifying audio synchronization issues according to an implementation. Operational scenario 400 includes received frames 430 with frames 410-416 and graph 405. Frames 410-416 each include an embedded code that can include an identifying frame number, audio frequency information for the frame, or some other information associated with the frame. Operational scenario 400 further includes graph 405, which includes an axis for time 450, an axis for frequency 452, and lines that represent expected audio signals 460 and actual audio signals 461.

In one implementation, a user computing system may establish a connection with a second remote computing system to receive video and audio data. The remote computing system may comprise a physical computing system or may comprise a virtual machine executing on a host. The connection may be used to provide a virtual desktop to the user computing system or provide streamed video data to the user computing system, such as for a video streaming platform. Here, the video data from the second computing system is represented as received frames 430. As the frames are received, the user computing system may identify the embedded code in each of the frames and determine audio sampling for the frame based on the embedded code. For example, codes 420-426 may represent QR codes and each of the QR codes may provide frequency information for the audio that corresponds to that frame. As an example, if the video were streamed at thirty frames per second and the sample rate for the audio were 44,000 samples per second for the video data, the expected audio data in the code may represent 1466 samples to represent the audio for that frame (1/30th of a second). As the expected audio data is derived using the included codes with the frames, the user computing system further monitors the output audio data on the user computing system while displaying the frames, wherein at least a portion of the output audio data is received from the second computing system. In some examples, the audio from the second computing system may be provided as a separate stream from the video data.

Once the expected audio data from the frames is identified with the actual output audio data when the frames are displayed, the user computing system may determine a synchronization status for the output audio data and frames 410-416 based on a comparison of the expected audio data and the output audio data. In the present implementation, graph 405 demonstrates an example where the actual audio signals 461 occur at a later time than expected audio signals 460. However, it should be understood that the actual audio signals may be synched with the expected audio signals or may come before the expected audio signals in some examples.

In some implementations, the user computing system may use the synchronization status to generate a summary of the synchronization of the audio data. The summary may indicate a graph, such as graph 405, may indicate a numerical value associated with the latency of the audio data, or may provide some other statistical information associated with the synchronization of the video data with the audio data. In some examples, a user at the end user computing system may initiate the streaming of the video and audio data from the second computing system. For example, prior to streaming a video, the user may initiate an audio synchronization test to determine whether the audio is synchronized with the video. In other examples, the second computing system may initiate the test and information about the audio synchronization status may be provided to the user at the user computing system or may be provided to a log associated with the service provider and the second computing system.

In some implementations, in addition to or in place of providing information about the audio synchronization to the user, the synchronization status may be used to trigger configuration modifications for displaying the frames and outputting the audio data. For example, when the audio data is behind the display of the frames, the user computing system or the second computing system communicating the frames may delay the display of the frames to synchronize the audio and the video.

Figure 5:
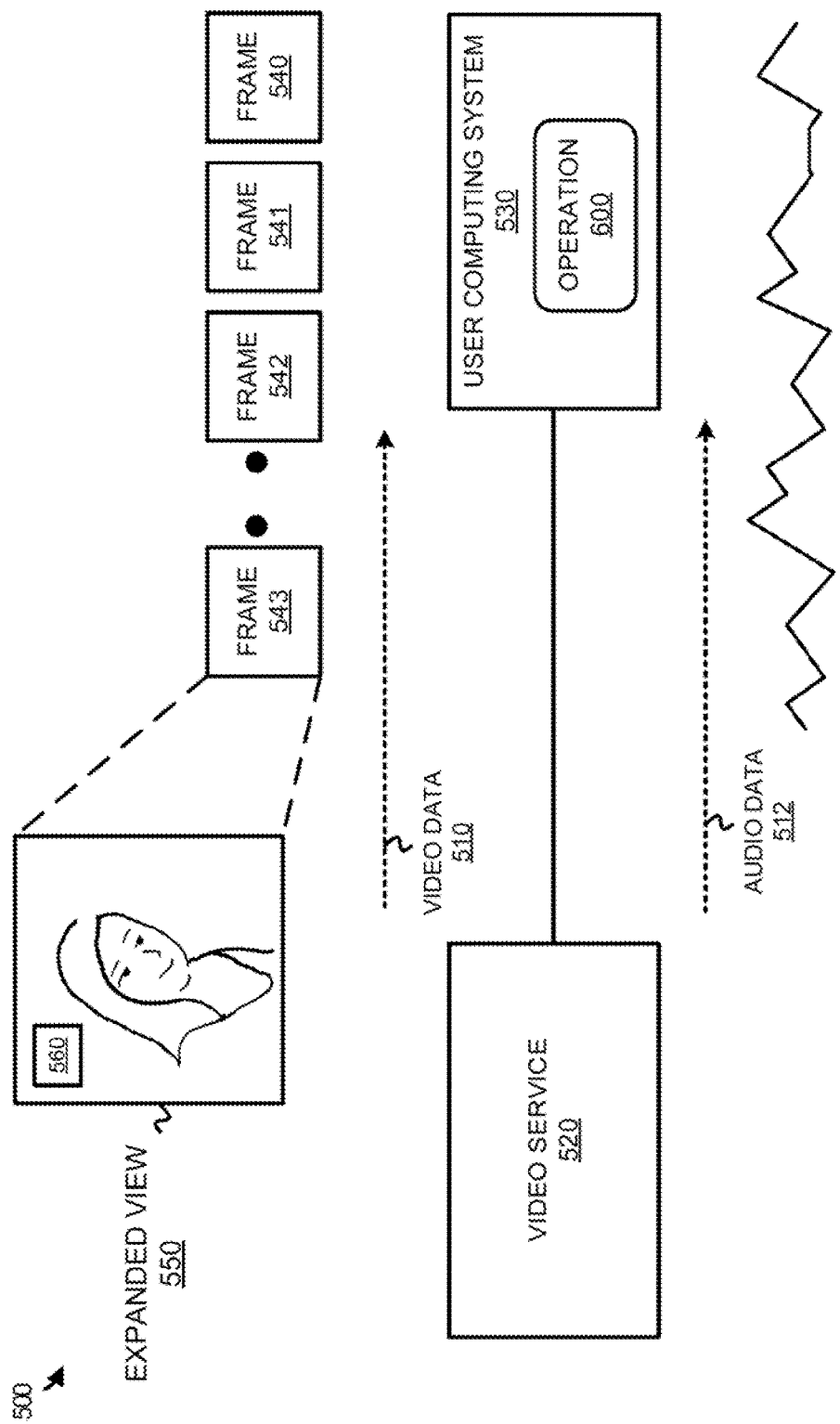
FIG. 5 illustrates a computing environment to monitor audio synchronization issues according to an implementation.

FIG. 5 illustrates a computing environment 500 to monitor audio synchronization issues according to an implementation. Computing environment 500 includes video service 520 and user computing system 530. Video service 520 communicates video data 510 as a first stream and audio data 512 as a second stream. Video data 510 includes frames 540-543, wherein frame 543 is further demonstrated with expanded view 550 that includes an embedded code 560. User computing system 530 provides operation 600 that is further described below in FIG. 6.

In operation, user computing system 530 may receive video data 510 and audio data 512 from video service 520. Video service 520 may comprise a virtual desktop service capable of providing remote computing resources to user computing system 530 or may comprise a video streaming service capable of communicating video for display at user computing system 530. As depicted, the video and audio data from video service 520 may be provided as separate data streams, which could permit synchronization errors between the video and audio. Advantageously, video service 520 may include codes in frames of video data 510 that indicate expected audio that corresponds to the frame, wherein the expected audio data may include sample frequencies identified for the frame.

As video data 510 is received and displayed, user computing system 530 may extract the expected audio data from the codes of frames 540-543 and compare the expected audio to the audio from audio data 512 to be output via speakers or some other device on user computing system 530. The comparison may be used to determine whether video data 510 is synchronized with audio data 512 or determine that the audio data is early or delayed in relation to the frames.

Figure 6:
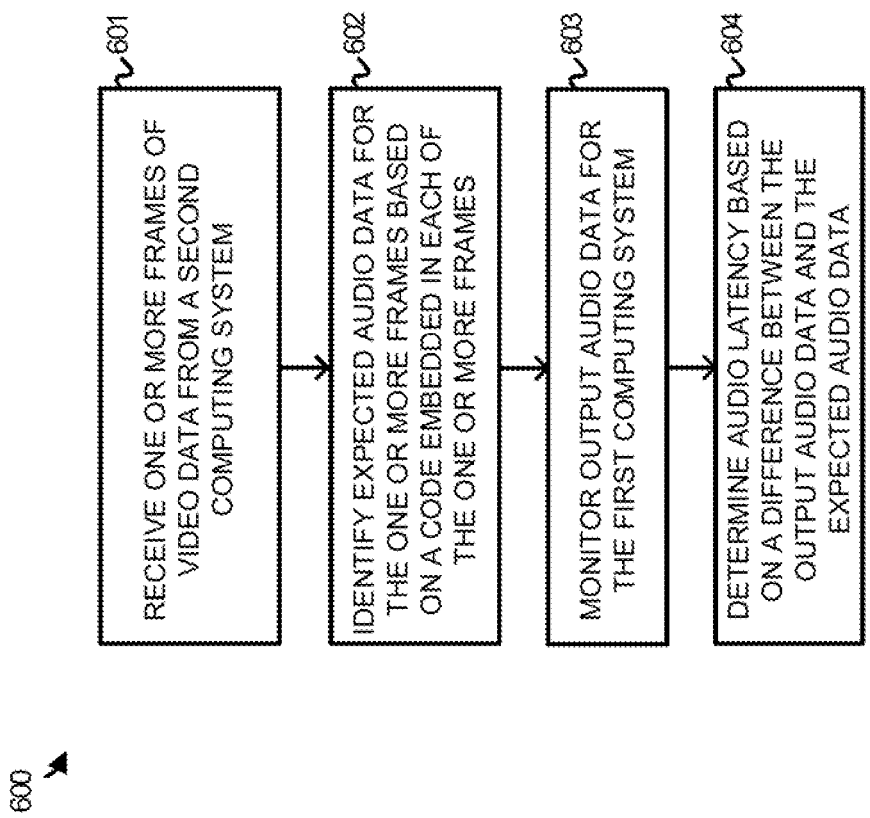
FIG. 6 illustrates an operation of a user computing system to identify audio synchronization issues according to an implementation.

FIG. 6 illustrates an operation 600 of a user computing system to identify audio synchronization issues according to an implementation. The steps of operation 600 are referenced parenthetically in the paragraphs that follow with reference to systems and elements of computing environment 500 of FIG. 5.

In operation, a first user computing system performs operation 600 to receive (601) one or more frames of video data from a second computing system and identify (602) expected audio data at the user computing system while displaying the one or more frames, wherein the output audio data is received at least partially from the second computing system. In some implementations, the second computing system may comprise a virtual desktop that executes on a host for a virtual desktop service. In other implementations, the second computing system may comprise a server for a video streaming service that provides video data to the user computing system. In some implementations, the video data 510 and the audio data 512 are provided as separate streams to user computing system 530, which can cause the audio data to be out of sync from the frames of the video data. In some examples, the video data with the embedded codes may be stored by either user computing system 530 (in the example of a virtual desktop environment) or video service 520 (in a video streaming environment) to test the synchronization of audio with the video frames.

As the expected audio data is identified for the frames, operation 600 further monitors (603) output audio data at the user computing system while displaying the one or more frames, wherein the output audio data is received at least partially from the second computing system. Operation 600 also determines (604) a synchronization status for the output audio data and the one or more frames based on a comparison of the expected audio data and the output audio data. In particular, as a frame is displayed at user computing system 530, audio output at the computing system may be monitored to determine whether the output audio data includes the audio samples provided for the displayed frame or may determine that the audio data is early or delayed in relation to the video data.

Once the synchronization status is determined between the output audio data and the frames, user computing system 530 may generate a summary that indicates the synchronization status. The summary may include a graph, numerical values indicating any differences between the output audio data and the expected audio data, or some other summary information. In some examples, the synchronization status may also be provided to video service 520, wherein video service 520 may maintain a log associated with video requests to video service 520. In some implementations, the synchronization status may be used to determine to determine changes to the configuration, wherein the synchronization status may be used to delay the audio output of the video played at the user computing system.

Figure 7:
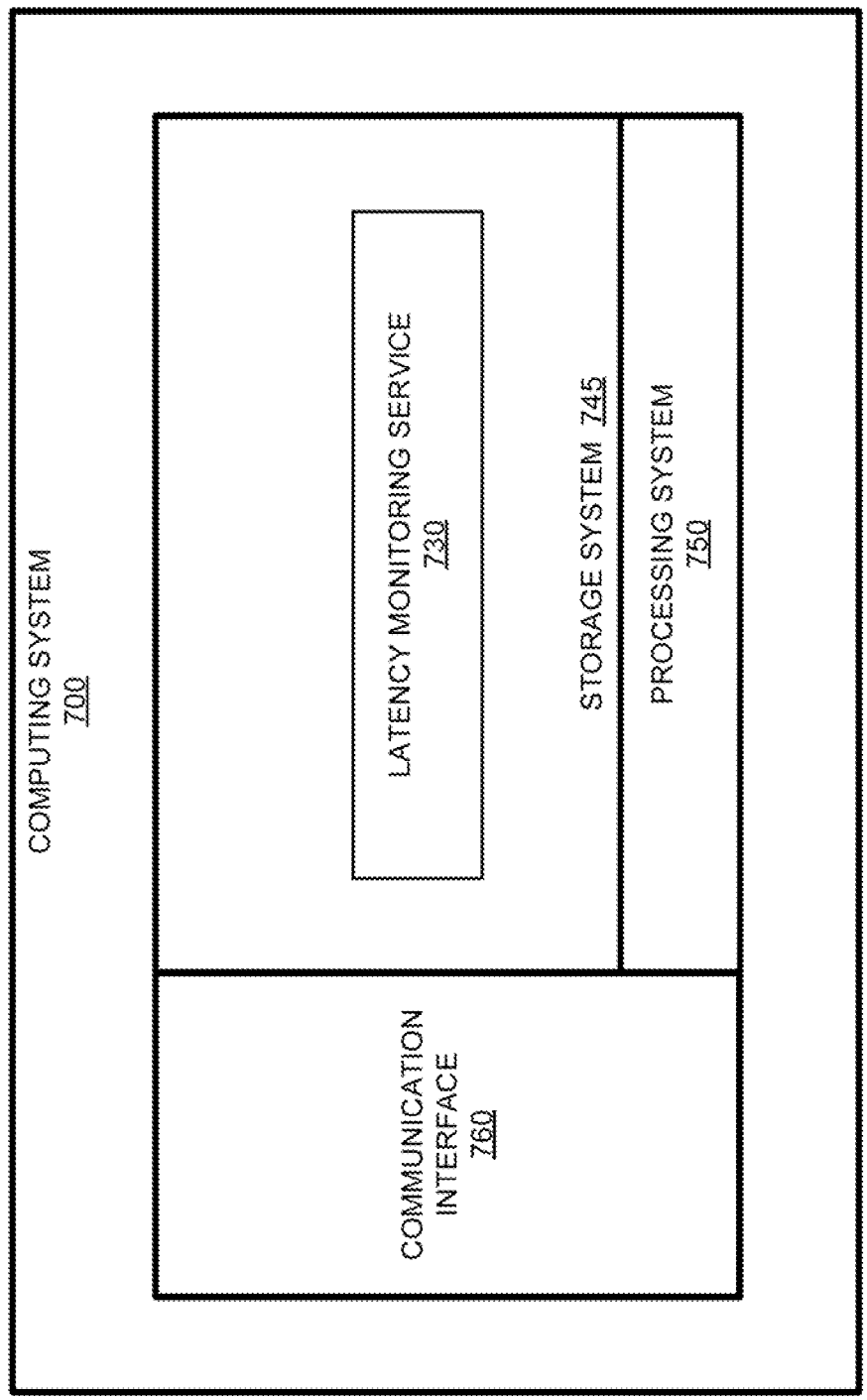
FIG. 7 illustrates a computing system to monitor audio and video latencies for a virtual desktop according to an implementation.

FIG. 7 illustrates a computing system 700 to monitor audio and video latencies for a virtual desktop according to an implementation. Computing system 700 is representative of any computing system or systems with which the various operational architectures, processes, scenarios, and sequences disclosed herein for a user computing system can be implemented. Computing system 700 is an example of user computing system 130 of FIG. 1 and user computing system 530 of FIG. 5, although other examples may exist. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 may be configured to communicate with a virtual desktop service in some examples to establish a connection with a virtual desktop. Communication interface 760 may further communicate with a video service that can provide streaming video to the computing system 700.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises latency monitoring service 730 that can provide at least operations 200 and 600 of FIGS. 2 and 6, respectively. The operating software on storage system 745 may further include an operating system, utilities, drivers, network interfaces, applications, or some other type of software. When read and executed by processing system 750 the operating software on storage system 745 directs computing system 700 to operate as described herein.

In at least one implementation, latency monitoring service 730 directs processing system 750 to receive a first frame of video data from a second computing system, wherein the video data is streamed by the first computing system to the second computing system. In some implementations, the streaming of the video data may include streaming the video data as though the video data was captured by a physical capture device at computing system 700, such as a video camera or video capture card. As the video data is streamed to the virtual desktop the video data may be processed by an application at the virtual desktop and added to the display on the virtual desktop, such as a video capture application executing on the virtual desktop. Thus, as at least a part of the virtual desktop display at computing system 700, the virtual desktop may include the video data streamed as part of the virtual capture device.

Once the frame is received, latency monitoring service 730 directs processing system 750 to identify a first frame number associated with the first frame based on code embedded in the first frame. In some implementations, the video data that is streamed from computing system 700 to the virtual desktop service may include frames with embedded information that can include a frame number and audio frequency information for samples associated with the frame. When a frame is returned from the virtual desktop service, latency monitoring service 730 may processes the embedded code to determine the frame number associated with the received frame. After identifying the frame number for the received frame, latency monitoring service 730 directs processing system 750 to identify a second frame of the video data to be streamed by the first computing system to the second computing system when the first frame was received and identifies a frame number associated with the second frame. In some examples, the second frame number may be determined based on a code embedded in the second frame. Latency monitoring service 730 further directs processing system 750 to determine frame latency based on a difference between the first frame number and the second frame number.

In some implementations, latency monitoring service 730 may receive the video data as part of a virtual desktop provided by a virtual desktop service. When the frame is received as part of a display for the virtual desktop at computing system 700, latency monitoring service may identify the next frame to be delivered or streamed to the virtual desktop as part of the video data. The frame numbers associated with the two frames may then be compared to determine the latency associated with communicating the frame to the virtual desktop and receiving the display of the virtual desktop.

In some examples, in addition to or in place of identifying the latency associated with the frames, the embedded code in the frames may be used to identify synchronization information between the video data and the audio data. In some examples, as video frames are received, the video frames may include a code that identifies frequency samples expected with the frame. Latency monitoring service 730 may direct processing system 750 to monitor actual output audio data at the computing system and compare the actual audio data to the expected audio data when the frames are displayed. Based on the comparison, latency monitoring service 730 may determine whether the audio is in sync, whether the audio is ahead of the video, or whether the audio lags behind the video.

In some implementations, a summary may be displayed based on the synchronization status, wherein the summary may graphically overlay the actual audio data over the expected audio data, may provide numerical values associated with the synchronization status, or may provide some other information about synchronization of the audio and video data. In some examples, the summary may further provide suggestions to fix any synchronization issues, may initiate operations to fix the synchronization issues, or may perform some other operation.

In some examples, the audio synchronization operations may be performed as part of the virtual desktop service, wherein the user computing system may determine the synchronization status associated with audio provided as part of the virtual desktop presented at the user computing system. In other implementations, the audio synchronization operations may be performed as part of a video streaming service. In particular, the video streaming service may use a video with embedded codes to identify synchronization issues between the video stream and the audio stream of the connected user device. The video streaming service may receive and maintain log information about the synchronization status, may attempt to correct any issues with the video or audio stream, or may provide some other operation based on the synchronization status. Similarly, the user computing system may update a local configuration to delay the audio or video data to synchronize the two streams based on the test video.

Although demonstrated in the previous examples as streaming video data as though the video data were obtained from a virtual capture device at the computing system, it should be understood that user computing system 130 may capture video data using the capture device, generate a code for each frame, including the frame number and audio sample information, and embed the code in the video data.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a first computing system, the method comprising:
   streaming video data from the first computing system to a virtual desktop executing on a second computing system, wherein the virtual desktop executes an application to view the video data;
   receiving a first frame of the video data as part of a display of the virtual desktop from the second computing system;
   identifying a first frame number for the first frame based on a code embedded in the first frame;
   identifying a second frame of the video data to be streamed by the first computing system to the virtual desktop when the first frame was received;
   identifying a second frame number associated with the second frame; and
   determining frame latency based on a difference between the first frame number and the second frame number.

2. The method of claim 1, wherein the second frame of the video data comprises a second code indicating at least the second frame number, and wherein the method further comprises:
   communicating the second frame to the virtual desktop executing on the second computing system.

3. The method of claim 1, wherein the application comprises a video conferencing application or live video application.

4. The method of claim 1 further comprising:
   receiving a third frame of the video data from the second computing system;
   identifying expected audio data for the third frame based on a code embedded in the third frame;
   monitoring output audio data for the first computing system; and
   determining audio latency based on a difference between the output audio data and the expected audio data.

5. The method of claim 4 further comprising:
   receiving one or more additional frames of the video data from the second computing system;
   identifying expected audio data for the one or more additional frames of the video data based on codes embedded in each of the one or more additional frames;
   determining the audio latency as a function of time based on a comparison of the output audio data and the expected audio data.

6. The method of claim 1, wherein the code comprises a Quick Response (QR) code.

7. The method of claim 1 further comprising:
   generating a display indicative of the frame latency.

8. The method of claim 7, wherein the display indicates a quality of service based on the frame latency.

9. A computing apparatus comprising:
   a storage system;
   a processing system operatively coupled to the storage system;
   program instructions stored on the storage system that, when executed by the processing system, direct the computing apparatus to:
      stream video data from the first computing system to a virtual desktop executing on a second computing system, wherein the virtual desktop executes an application to view the video data;
      receive a first frame of the video data as part of a display of the virtual desktop from the second computing system;
      identify a first frame number for the first frame based on a code embedded in the first frame;
      identify a second frame of the video data to be streamed by the first computing system to the virtual desktop when the first frame was received;
      identify a second frame number associated with the second frame; and
      determine frame latency based on a difference between the first frame number and the second frame number.

10. The computing apparatus of claim 9, wherein the second frame of the video data comprises a second code indicating at least the second frame number, and wherein the program instructions further direct the computing apparatus to:

communicate the second frame to the virtual desktop executing on the second computing system.

11. The computing apparatus of claim 9, wherein the application comprises a video conferencing application or live video application.

12. The computing apparatus of claim 9, wherein the program instructions further direct the computing apparatus to:

receive a third frame of the video data from the second computing system;

identify expected audio data for the third frame based on a code embedded in the third frame;

monitor output audio data for the first computing system; and determine audio latency based on a difference between the output audio data and the expected audio data.

13. The computing apparatus of claim 12, wherein the program instructions further direct the computing apparatus to:

receive one or more additional frames of the video data from the second computing system;

identify expected audio data for the one or more additional frames of the video data based on codes embedded in each of the one or more additional frames;

determine the audio latency as a function of time based on a comparison of the output audio data and the expected audio data.

14. The computing apparatus of claim 9, wherein the code comprises a Quick Response (QR) code.

15. The computing apparatus of claim 9, wherein the program instructions further direct the computing apparatus to generate a display indicative of the frame latency.

16. The computing apparatus of claim 15, wherein the display indicates a quality of service associated with the frame latency.

17. A method of operating a first computing system comprising:

receiving one or more frames of video data from a second computing system;

identifying expected audio data for the one or more frames based on a code embedded in each of the one or more frames;

monitoring output audio data at the first computing system while displaying the one or more frames, wherein the output audio data is received at least partially from the second computing system;

determining a synchronization status for the output audio data and the one or more frames based on a comparison of the expected audio data and the output audio data.

18. The method of claim 17, wherein the code comprises a Quick Response (QR) code.

19. The method of claim 17 further comprising generating a display of the synchronization status.

20. The method of claim 17, wherein the synchronization status comprises latency associated with the output audio data.

* * * * *